United States Patent [19]
Fields

[11] Patent Number: 5,929,144
[45] Date of Patent: Jul. 27, 1999

[54] PLASTICIZED STYRENE ETHYLENE BUTYLENE STYRENE (SEBS) COPOLYMER RUBBER MODIFIED ASPHALT MIXTURE

[76] Inventor: John R. Fields, 22626 -120th E., Summer, Wash. 98309

[21] Appl. No.: 08/978,244

[22] Filed: Nov. 25, 1997

Related U.S. Application Data

[60] Provisional application No. 60/031,966, Nov. 27, 1996.
[51] Int. Cl.$^6$ ........................................... C08L 95/00
[52] U.S. Cl. ................................ 524/62; 524/61; 524/68
[58] Field of Search ................................ 524/60, 61, 62, 524/68

[56] References Cited

U.S. PATENT DOCUMENTS

| | | | |
|---|---|---|---|
| 4,032,491 | 6/1977 | Schoenke | 524/68 |
| 4,923,913 | 5/1990 | Chic et al. | 524/68 |

OTHER PUBLICATIONS

Michael Russo, "Modified Asphalt: A high–end option for BUR", *Roofing, Siding and Insulation,* May 1989.

Auth. Unk., "Kraton G Polymer Modified Asphalts", Shell Chemical Company, Apr. 1989.

Auth. Unk., "Kraton G. Rubber: Modifier of asphalt for built–up roofing", Shell Chemical Company, 1987.

Auth. Unk., "Kraton G. Rubber: Uniquely versitile as a modifier for asphalt roofing systems", Shell Chemical Company, 1987.

Auth. Unk., "Weighing the Advatages of SEBS Modified Asphalt", *Roofing Siding and Insulation,* Aug. 1997.

*Primary Examiner*—Paul R. Michl
*Attorney, Agent, or Firm*—Garrison & Associates PS; Matthew J. Marquardt; David L. Garrison

[57] ABSTRACT

Process and composition for styrene-ethylene-butylene-styrene (SEBS) block copolymer modified asphalt mixtures for use in roofing, sealing, paving, and waterproofing membranes. A plasticized SEBS compound is added to oxidized or unoxidized asphalt flux in either low-shear or high-shear processes, and is applied in hot and ambient uses such as cutbacks and emulsions, with or without added fillers, fibers, or other additives.

10 Claims, 2 Drawing Sheets

PLASTICIZED STYRENE ETHYLENE BUTYLENE STYRENE (SEBS) COPOLYMER RUBBER MODIFIED ASPHALT MIXTURE

This application claims the benefit of U.S. provisional patent application Ser. No. 60/031,966, filed Nov. 27, 1996, and entitled Styrene Ethylene Butylene Styrene (SEBS) Copolymer Rubber Modified Asphalt Mixture.

TECHNICAL FIELD

The invention relates to asphalts and petroleum-based sealants and pavings; more particularly, it relates to styrene ethylene butylene styrene (SEBS) copolymer modified asphalt mixtures.

BACKGROUND OF THE INVENTION

Asphalts have been used as sealants and paving compounds for thousands of years, on roofs, roads, and in many other applications. Originally they were taken straight from bituminous deposits in the earth and applied directly. More recently they have been derived from the distillation of petroleum products, typically being defined as the end residue of the distillation process.

For many years asphalts were used in the rough forms in which they were found or distilled, without additives. As a result of efforts to address the non-uniform composition and low melting or softening points of the distillate residues used as asphalt, however, additives began to be employed. It is now typical for raw asphalt residues to be blended with various additives into relatively uniform "flux" asphalts which may either be applied directly or used as base stock for more specialized or improved asphalt forms. Most typically, however, the resultant fluxes are modified even further before use, as they typically retain unacceptably low softening points —in the range of 85–90° F. Given that surface temperatures on an asphalt roof or roadway may, under a summer sun, climb higher than 250° F., it may be seen that in many applications softening points in the region of 90° F. are unsuitable.

One of the most common means of raising the softening point of flux asphalts, and thereby increasing their utility, is the addition of oxygen to the flux. In a typical oxidation process, flux asphalt is placed in a large holding tank and heated to approximately 500° F. at atmospheric pressure, and air is introduced at the bottom of the tank and allowed to percolate up toward the top of the asphalt, creating an exothermic chemical reaction which, depending upon the amount of oxygen added, has the effect of raising the softening point of the asphalt to more than 225° F. The ASTM has published, in its D312-95a Standard Specification for Asphalt Used in Roofing, standards for the oxidation of asphalts, including a specification of physical properties of the asphalts following oxidation. ASTM standards from D312-95a are shown in Table 1. Type IV is the most highly oxidized of the ASTM asphalts, Type I the least.

TABLE 1

| Property | Type I | | Type II | | Type III | | Type IV | |
|---|---|---|---|---|---|---|---|---|
| | min | max | min | max | min | max | min | max |
| Softening point (° F.) | 135 | 151 | 158 | 176 | 185 | 205 | 210 | 225 |
| Flash point (° F.) | 500 | — | 500 | — | 500 | — | 500 | — |
| Penetration (units, 77° F.) | 18 | 60 | 18 | 40 | 15 | 35 | 12 | 25 |
| Ductility (cm at 77° C.) | 10.0 | — | 3.0 | — | 2.5 | — | 1.5 | — |
| Solubility in trichloroethylene (%) | 99 | — | 99 | — | 99 | — | 99 | — |

As shown in Table 1, however, an undesirable side effect of the oxidation process is a reduction in the ductility of the oxidized asphalt. The reduction in ductility results in a decreased resistance to thermal fatigue cycles, increased brittleness, and accelerated material breakdown. Thus further additives have been sought as a means of restoring, or even improving, flexibility and thermal resistance of oxidized asphalts. Beginning some years ago attempts were made to introduce various rubbers and rubber compounds to a wide variety of asphalt types. For example, U.S. Pat. No. 4,273,685to Marzocchi et al. discloses a rubber modified asphalt composition prepared by reacting a bituminous material with a polymerizable aromatic monomer and a rubbery polymer whereby the rubbery polymer is chemically integrated with the asphalt. U.S. Pat. Nos. 5,334,641and 5,525,653to Rouse disclose process for blending finely-ground recycled waste rubber at a −50 to −80 mesh particulate size with asphalt, while acknowledging that success in mixing asphalt with rubber is dependent upon the nature of the rubber used as well as its particulate size. Causyn et al., U.S. Pat. No. 5,436,285, discloses an improved paving composition comprising graded aggregate, asphalt, SBR polymer, and recycled crumb rubber. And Aoyama et al., U.S. Pat. No. 5,674,313, discloses a cationic-rubber modified asphalt emulsion with an organic coagulating agent.

It was early found, however, that while increasing the flexibility, and therefore the durability, of asphalts exposed to repeated heat-induced expansion and contraction cycles, the addition of rubber can substantially degrade the resistance of the asphalt mix to ultraviolet (UV) rays and attack by atmospheric ozone, thus again resulting in a mix which ultimately turns brittle and loses its sealing or paving attributes. Thus there exists and has for some time existed a need for an improved rubber additive —one which is more UV and ozone resistant, strong, and impervious to water, while retaining the ability to restore flexibility and durability to an oxidized asphalt. One of the most attractive candidates as such an additive has been styrene-ethylene-butylene-styrene block copolymer (SEBS). In comparison with other rubbers, and in particular with rubbers commonly used to modify asphalts, including styrene-butadiene-styrene (SBS) rubber, SEBS has been found to have superior UV and temperature-cycle damage resistance qualities, greater thermal stability, lower permeability to moisture, and improved resistance to attack by ozone, fats, and oils. But it has also been found that the introduction of SEBS rubber to asphalt presents special difficulties. Attempts to blend SEBS with asphalt in the manner used for other rubbers showed that the SEBS would not blend properly in such processes, particularly with oxidized asphalts. In particular, it has been found that attempting to modify oxidized asphalts with SEBS rubber according to prior art methods results in virtually complete failure. It appears that this is because the oxidation process itself drives off many of the more volatile components of the asphalt flux (commonly referred to as the "light end" components of the flux), which if present would act as solvents and/or catalysts to facilitate the breakdown or dissolution of the rubber compound and its chemical bonding with the asphalt to form a homogeneous modified asphalt product. With critical amounts of the lighter end materials driven off, the rubber cannot dissolve and bond with the asphalt in the required proportions, and instead remains largely separate in a rubber-asphalt suspension having undesirable service properties for sealing and paving.

Thus there exists a need for a fast, economical, and reliable process for effectively and thoroughly mixing SEBS rubber with asphalt, and in particular with oxidized asphalt, for use in roofing, sealing, paving, waterproofing membranes and other related technologies, in order to provide a strong, flexible, water-impervious, UV and ozone-resistant, durable asphalt having a high softening or melting point.

DISCLOSURE OF THE INVENTION

Accordingly, it is an object of the invention to provide fast, economical, and reliable process for effectively and thoroughly mixing SEBS rubber with asphalt, and in particular with oxidized asphalt, for use in roofing, sealing, paving, waterproofing membranes and other related technologies.

It is a further object of the invention to provide a family of strong, flexible, water-impervious, UV and ozone-resistant, durable asphalts having high softening or melting points.

It is a further object of the invention to provide process for making an SEBS rubber modified asphalt mixture suitable for preparation with low-shear mixing equipment, without the addition of heat during the blending process.

It is a further object of the invention to provide SEBS rubber modified asphalt mixtures, in particular using oxidized asphalts, for a variety of roofing, sealing, and paving applications.

It is a further object of the invention to provide mineral spirit cutback SEBS rubber modified asphalt mixtures suitable for use at ambient temperatures.

It is a further object of the invention to provide SEBS rubber modified asphalt emulsions suitable for use at ambient temperatures.

It is yet another object of the invention to meet any or all of the needs summarized above.

These and such other objects of the invention as will become evident from the disclosure below are met by the invention disclosed herein.

The invention addresses and provides such a system. The invention represents process and product for styrene-ethylene-butylene-styrene (SEBS) block copolymer modified asphalt mixtures for use in roofing, sealing, paving, waterproofing membranes. Plasticized SEBS block copolymer compounds are added to oxidized or unoxidized asphalt flux in both low-shear blenders and high-shear mixers, and combined at 250–500° F.; the resulting modified asphalt is applied both directly and in further-modified hot and ambient applications such as cutbacks and emulsions, with or without added fillers, fibers, or other additives.

In one aspect the invention provides process for maling an SEBS rubber modified asphalt mixture for use in roofing, sealing, paving, waterproofing membranes and other related technologies by placing a plasticized SEBS compound in a mixing vessel, adding asphalt at a temperature of approximately 250 to approximately 500° F., and mixing the asphalt with the plasticized SEBS compound, whereby an SEBS rubber modified asphaltic mixture results. In preferred embodiments, the plasticized SEBS compound is introduced to the mixture in the form of gelled bricks comprising SEBS block copolymer, napthenic oil, and dioctyl phthalate; and the asphalt used in the mixture has been oxidized, as for example to the ASTM Type I, Type II, Type III, or Type IV standards described above. The use of such gelled plasticized SEBS compounds with asphalt at 250to 500° F. is found to allow mixing of the SEBS and the asphalt without the introduction of additional heat during the mixing process, within at least the range of mixture proportions of 1% to about 25% SEBS, by weight, to asphalt mixture. That is, it is found that the heat contained within the asphalt is sufficient to facilitate the mixing process and any associated chemical reactions at least over such ranges, without lowering the temperature of the mixture below the softening point of the asphalt mix. Moreover, it is found that most of the advantages associated with using SEBS as an asphalt modifier are realized within that proportion range.

Another aspect of the invention is an asphaltic copolymer mixture useful in roofing, sealing, paving, waterproofing membranes and related applications, comprising at least 1% by weight of SEBS and suitable for use in "hot" applications, or those in which the asphalt is maintained at a temperature substantially above its softening point, as by addition of heat on the job site, while being used: for example, in hot mopping applications. Preferred embodiments of this aspect of the invention are made using oxidized asphalt and comprise from about 1% to about 25% by weight SEBS. Other aspects of the invention include such mixtures further modified by the introduction of mineral spirits to form "cutback" compositions suitable for use at ambient temperatures (i.e. without the requirement of maintaining the composition at an elevated temperature at the point of application) and those modified by the addition of water slurry to form emulsions also suitable for use at ambient temperatures. Cutback asphalts are preferred for use as mastics, coatings, adhesives, and cements, while emulsions are preferred for use as coatings, adhesives, waterproofings, sealings, and pavings. Preferred cutbacks comprise 30% to 50% by weight of mineral spirits; emulsions 40% to 60% by weight water slurry.

BEST MODE OF CARRYING OUT THE INVENTION

Figure 1:
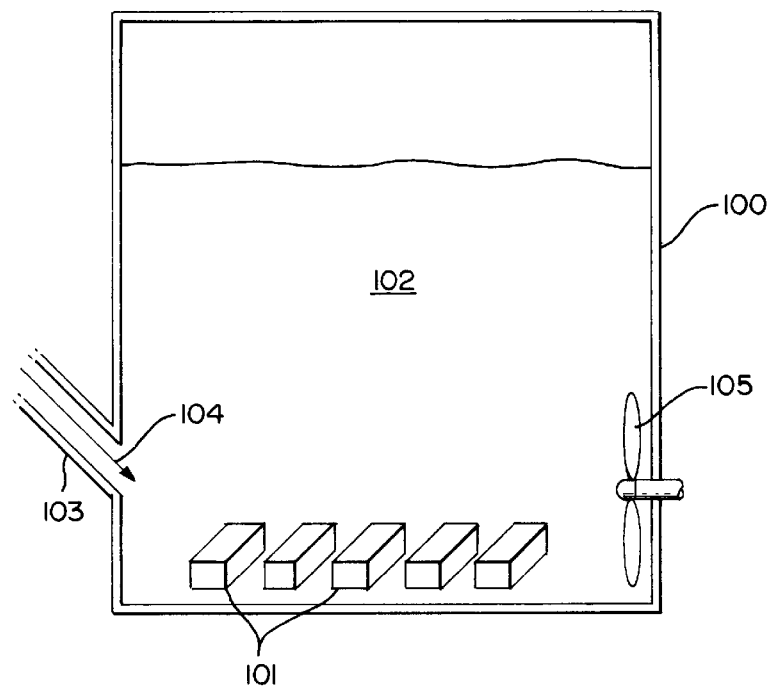
FIG. 1 is a schematic view of a preferred process for making SEBS modified asphalts according to the invention.

Preliminarily, several terms are defined as they are used in this specification.

Asphalt, for the purposes of this disclosure, means any bituminous material or hydrocarbon, with or without additives, fillers, or aggregates, having sufficient insolubility in water and viscosity to be used advantageously in roofing, sealing, paving, or waterproofing, whether naturally occurring or distilled from petroleum or like products.

SEBS, SEBS rubber, SEBS copolymer, and SEBS block copolymer means styreneethylene-butylene-styrene block copolymer, such as that produced and sold by the Shell Chemical Company under the tradename KRATON, and in particular that sold as KRATON G-1650, G-1652, G-1657, and G-1726. In such forms it is typically found commercially in powder or pellet form, and in some instances in plasticized compounds. Molecure weights of SEBS may vary, with center segments comprising hydrogenated polybutadiene, randomly 1,2 and 1,4, and the end segment of styrene and the ration of styrene to hydrogenated butadiene being about 3:7 by weight.

Plasticized SEBS, or plasticized SEBS compound, means any compound or composition containing SEBS rubber and substantial or significant amounts of any plasticizer. Preferred forms of such SEBS compounds include any such compounds containing at least one additive (whether termed as plasticizer, fillers, extenders, solvents, or carriers) selected from the group of napthenic oil and dioctyl phthalate. Preferred forms of such plasticized SEBS compounds comprise between approximately 25% and approximately 40% by weight napthenic oil and/or between approximately 1% and approximately 6% by weight dioctyl phthalate. An example used in preferred processes and products according to the invention is that sold in gelled brick or block form by Imperbel America Corporation of 717South 38th, P.O. Box 6761, Kansas City, Kans., under the product designation I-175. Gelled bricks of I-175 contain approximately 62% by weight (63.5% by volume) SEBS block copolymer, approximately 33% by weight or volume napthenic oil, approximately 3% by weight or volume dioctyl phthalate, and approximately 1% or less carbon black and minor amounts of miscellaneous extractables, as for example waxes or other processing aids, and have melting points between approximately 150 and approximately 500° F.

Gelled SEBS or gelled brick means any SEBS compound, suspension, colloid, or other mixture comprising SEBS in a form which is solid or semi-solid at ambient temperatures (i.e. between approximately 50 and 90° F.) and which has a melting point between approximately 150 and 500° F., and preferably below 250° F. Preferred forms of such bricks comprise napthenic oil, dioctyl phthalate, or other plasticizer, additives, bonding agents, fillers, or catalysts according to this disclosure.

Turning now to the drawings, the invention will be described in a preferred embodiment by reference to the numerals of the drawing figures wherein like-numbers indicate like parts.

FIG. 1 is a schematic view of a preferred process for making SEBS modified asphalts according to the invention. Plasticized SEBS compound 101, shown in the form of gelled bricks and preferably at ambient temperature (typically 40–110° F.), is disposed inside mixing vessel 100. Asphalt 102, which has a temperature between 250and 500° F., has been transferred to the vessel through line 103 in the direction of arrow 104 and onto the plasticized SEBS compound. Activation of rotor 105 causes the asphalt and the plasticized SEBS compound to mix, resulting in an SEBS rubber modified asphalt mixture having a viscosity at 400° F. of about 50 to 350 centipoise and suitable for use in roofing, sealing, paving, waterproofing membranes and other related technologies. It is preferred, when practicing this aspect of the invention, to use basic, non-modified oxidized asphalts made from flux asphalts like that available from U.S. Oil and Refining Company of Tacoma, Wash. for combination with the SEBS. However, any of the asphalts as defined herein will serve.

A preferred form of the plasticized SEBS compound for use in practicing this aspect of the invention is a gelled SEBS block copolymer brick comprising approximately 40% or more SEBS and plasticizer, solvents, catalysts, or fillers such as napthenic oil and/or dioctyl phthalate and/or carbon black, as described herein. Such a compound is available in fifty-pound gelled bricks under the product designation I-175 from the Imperbel America Corporation, as previously described. However, any composition containing one or more plasticizer, fillers, extenders, solvents, catalysts, or carriers of the type described will serve, as will be appreciated by those of ordinary skill in the art.

One of the principal advantages of this aspect of the invention is that it allows SEBS rubber, taken at ambient temperature, to be mixed with and to modi fy asphalts in low-shear processes, and that it allows such mixing without the necessity of adding heat to the mixture during the mixing or blending process. When plasticized (and preferably gelled) SEBS compounds of the type described are mixed with asphalts in the proportions contemplated, the residual heat held by the asphalt upon placement in the mixing vessel is sufficient to soften the gelled compounds without so cooling the asphalt as to reduce its temperature to or near the softening point, so that the mixture retains a sufficiently low viscosity (in fact, it has been observed to remain substantially the same as the warm flux) to remain relatively readily mixable and amenable to combination of the SEBS with the asphalt. This means that mixing may be accomplished very satisfactorily in an unheated low-shear mixing vessel. For example, the invention has been practiced quite satisfactorily using oxidized asphalt at approximately 450–500° F. and adding 1% to 20% by weight of SEBS (1% to 50% plasticized SEBS compound) in gelled brick form at ambient temperature, mixed with Model 10-SV2S-4 10 h.p. Side Entry Mixer/Agitator manufactured by the Burhans-Sharpe Company of Seattle, Wash., installed in an unheated 30,000 gallon tank, at approximately 100–300 RPM (preferably at about 200 RPM) for approximately one to three hours, yielding approximately 30,000 gallons of SEBS modified asphalt at approximately 400° F. The resultant savings in time, money, and equipment costs, as compared to other methods for preparing rubber modified asphalts, using either SEBS or other rubbers, are substantial, especially where the need arises to use heated, high-shear mixing vessels.

It is believed that one of the reasons for the success of this aspect of the invention is that the presence in such compounds of the plasticizer, and in particular the napthenic oil and dioctyl phthalate, acting with or without carbon black or other additives, acts to break down or dissolve the SEBS copolymer and facilitate its chemical bonding with the asphalt. That is, it places or helps to place the SEBS into an intermediate phase from which the SEBS is more readily soluble in asphalt. In particular, it is believed that the plasticizer affect the links between the styrene and other components of the SEBS and thereby facilitates incorporation of the rubber. Thus when such SEBS compounds are mixed with oxidized asphalts in particular, the plasticizer are believed to take the place functionally of the "lighter end" products typically driven off from the asphalt during the oxidation process.

The most advantageous proportion of SEBS to be blended with an asphalt depends upon the specific application to which the asphalt is ultimately to be put. In general, it is found that adding SEBS to an asphalt mixture raises the softening point of the mixture until approximately a 20% to 25% by weight concentration of SEBS has been reached, at which point properties such as the softening point remain constant or in some cases even deteriorate slightly. Similarly, improvements in flexibility and durability tend to be maximized at or below about the 20% to 25% concentration (of SEBS) level. For most roofing applications it has been found that a 3% to 10% proportion by weight of SEBS copolymer in a total mixture gives best performance and excellent economical results in providing strong, hard yet flexible, water-impervious, UV and ozone-resistant, durable asphalts with advantageous softening or melting points. Beyond a 10% concentration the benefits realized by the asphalt in hardness, strength, flexibility, water-imperviousness and UV and ozone resistance of adding SEBS tend to be offset by declining returns and increased costs (as for example for the SEBS itself), and by increased mixing times and costs. Preferred concentrations for specific applications, exclusive of any additional materials (such as solvents or emulsifiers) which may be added, are given in Table 2.

TABLE 2

| Application | SEBS content, by weight (%) | Softening Point (° F.) |
| --- | --- | --- |
| Hot mopping | 8–12 | 135–225 |
| Coating for waterproofing membranes | 4–6 | 160–225 |
| Raw asphalt for mineral spirit based cutbacks | 3–5 | 115–225 |
| Raw asphalt for emulsions | 4–6 | 90–150 |
| Raw asphalt for paving and crack filling | 6–8 | 90–200 |

Another principal advantage of this process aspect of the invention is its suitability for use with oxidized asphalts. As has already been discussed, oxidation is generally beneficial for raising the softening or melting point and improving the weather-resistant qualities of an asphalt, and SEBS is the best known of all additives for offsetting the brittleness and hardness, and therefore the thermal intolerance, associated with unmodified oxidized asphalts. But prior to the invention of the process disclosed herein it was impossible, as previously discussed, to satisfactorily mix oxidized asphalts with SEBS. It has been found that the modification of asphalts of all degrees of oxidation, or all ASTM Types, according to the process of this aspect of the invention, is as easy and effective as with uhoxidized asphalts.

It is immaterial to any of the processes disclosed herein whether the asphalt or the SEBS is placed in the mixing vessel first, or whether they are added simultaneously.

Figure 2:
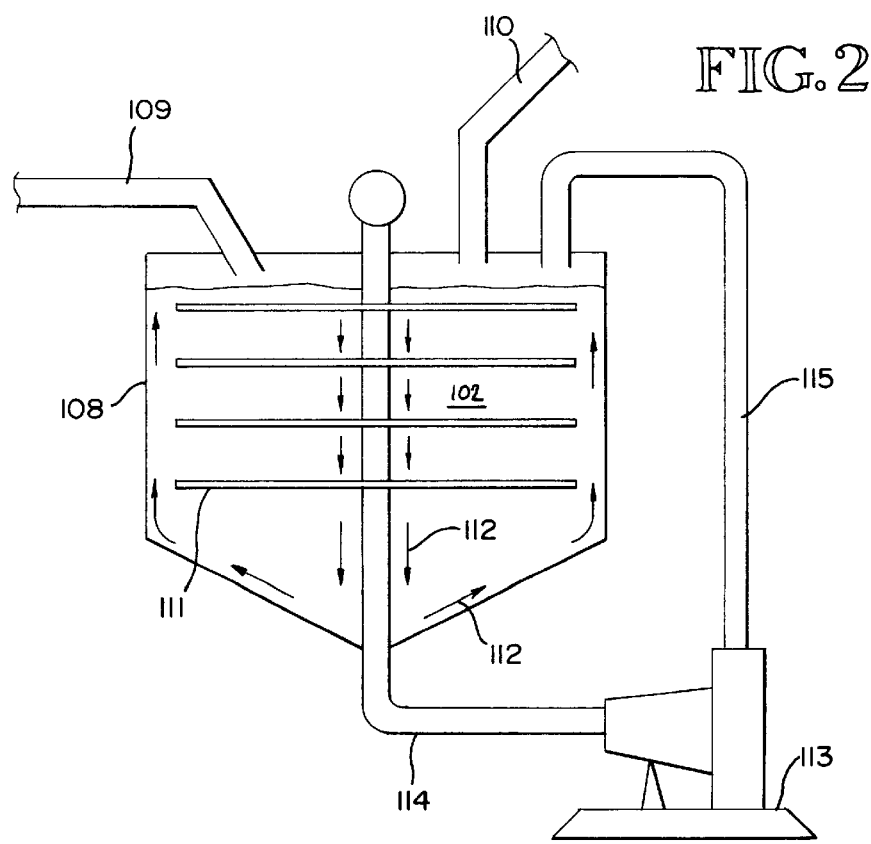
FIG. 2 is a schematic view of a preferred embodiment of an alternative preferred process for making SEBS modified asphalts according to the invention.

FIG. 2 is a schematic view of an alternative preferred process for making SEBS modified asphalts according to the invention. Asphalt 102 is fed to tank 108 (which may have a capacity of 30,000 gallons or more) through asphalt feed 110 and blended with plasticized SEBS compound inside the tank by means of agitator 111. Agitator 111, which comprises a plurality of blades 145, prevents the SEBS from settling out of the asphalt and maintains a relatively uniform blend by continuously agitating the mix, keeping the flow moving substantially in the directions shown by arrows 112. The asphalt - SEBS blend is continuously fed through high-shear mixer 113 via feed 114 and returned to the tank after high-shear mixing via return line 115. A Siefer Trigonal wet mill or grinder model no. SM 290/HK, available from Siefer Maschinenfabrik GmbH and Co. K. G. through Siefer America Inc. has been used very successfully with this aspect of the invention. (Note that it is quite possible, and in many circumstances advantageous, to blend the asphalt with a plasticized SEBS compound of the type described herein by use of this process. In such cases it is both possible and sometimes advantageous to replace high shear mixer 113 with a pump.)

It is believed that one of the reasons behind the success of this aspect of the invention is that the relatively high shear rates to which the blend is subjected in the high-shear mixer, especially when taken with the 300–400° F. temperatures, causes the SEBS to break down and be dissolved in, and ultimately bonded with, the asphalt -- despite, in processes using oxidized asphalts, the absence of "light end" products typically driven off from the asphalt during the oxidation process.

A principal advantage of the invention is that the advantages won through the modification of asphalts with SEBS rubbers extend through further modifications of modified asphalt stock to a full range of specialized asphalts, and are noted throughout the range of applications to which such specialized asphalts are typically placed. For example, SEBS modification provides the benefits noted in otherwise-conventional mineral spirit cut-back and emulsified asphalts, which are typically applied at ambient temperatures, and in each of the applications to which such asphalts are put. Asphalts of such further-modified types are modified by the addition of SEBS in the manner previously described, by means of any of the abovedescribed processes; the advantages of SEBS modification are realized in such asphalts without need for modifying downstream processes once the basic stock asphalt has had SEBS added to it.

Figure 3:
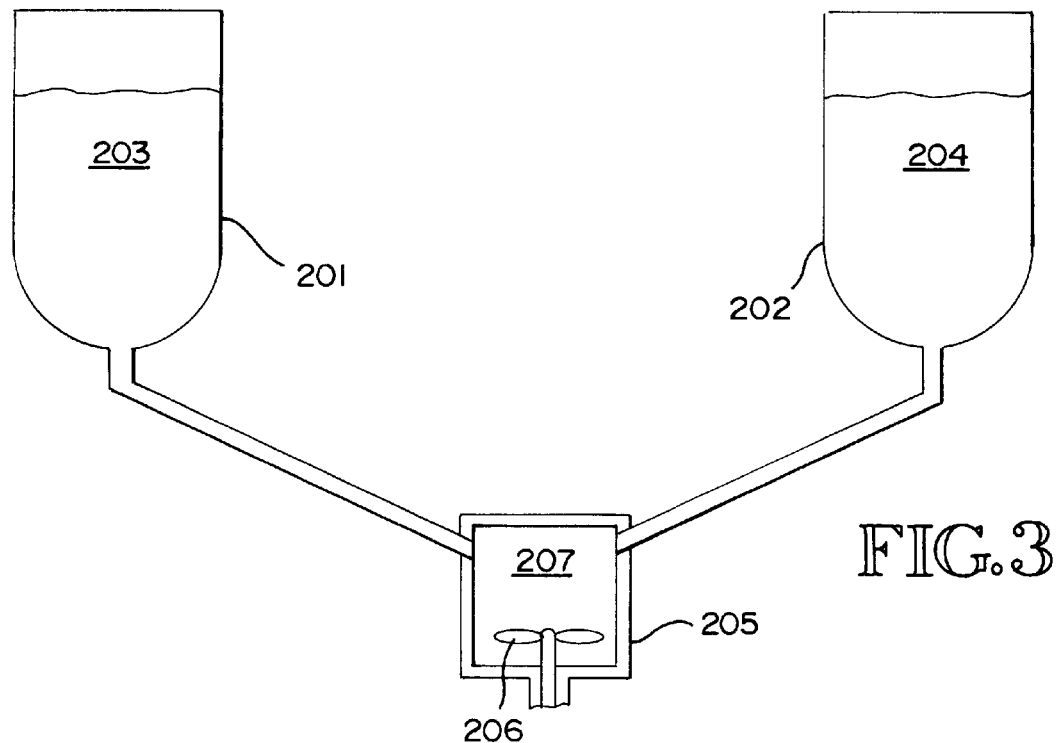
FIG. 3 is a schematic view of a preferred process for making an SEBS modified, mineral spirit cut-back asphalt according to the invention.

In the case of mineral spirit cutback asphalts, it has been found that the advantages of SEBS modification are best realized by the addition of approximately 4% to approximately 6% by weight SEBS rubber to the asphalt stock, and by the later addition of mineral spirits to comprise between approximately 30% and approximately 50% by weight of the cutback mixture. Preferred mineral spirits for use with this aspect of the invention comprise any of the common industrial grade mineral spirits, in particular those having kauri-butanol (k.b.) values of 30 or greater, and flashpoints of 100° F. or greater. In particular, the mineral spirits available commercially from the Exxon Corporation under the trade name Varsol 3139 has been found to work satisfactorily with the modified asphalts of the invention. A preferred process for producing SEBS-modified cut-back asphalts is shown in FIG. 3. SEBS-modified asphalt 203, prepared by any of the foregoing processes, is introduced to mixing tank 205 from tank 201. Mineral spirits 204, which may contain additives for a variety of reasons known in the industry, are supplied from tank 202 and placed with the asphalt in blender or mixing tank 205. In tank 205, rotor 206, which may take the form of the side-mounted mixer previously described, mixes asphalt stock 203 and mineral spirits 204 to make cut-back asphalt mixture 207. In preferred processes the asphalt and mineral spirits are mixed, or blended, for a period of approximately 1to approximately 3 hours at about 100 to about 300 RPM (preferably about 200 RPM) without added heat. It is noted, however, that the asphalt mixture and the cutback agents typically mix so readily that they may even just be dumped together with a bare minimum of mixing, or with no mixing at all, with satisfactory results. The modification of asphalts in the manner described (i.e. by the addition of cut-back agents) results in a softer, more pliable asphalt, suitable for use at ambient temperature for coatings, adhesives, mastics, or cements. As will appear to those of ordinary skill in the art armed with the disclosure of this invention, mixing times, rates, and temperatures may be modified to within generally-accepted, otherwise-conventional ranges for the mixing of such asphalts. Moreover, the types of fillers typically incorporated in such special purpose asphalts, especially in coatings, adhesives, and mastics, and which are well known to those of ordinary skill in the art of creating such asphalts, are used to good advantage with the SEBS-modified asphalts of the invention.

Figure 4:
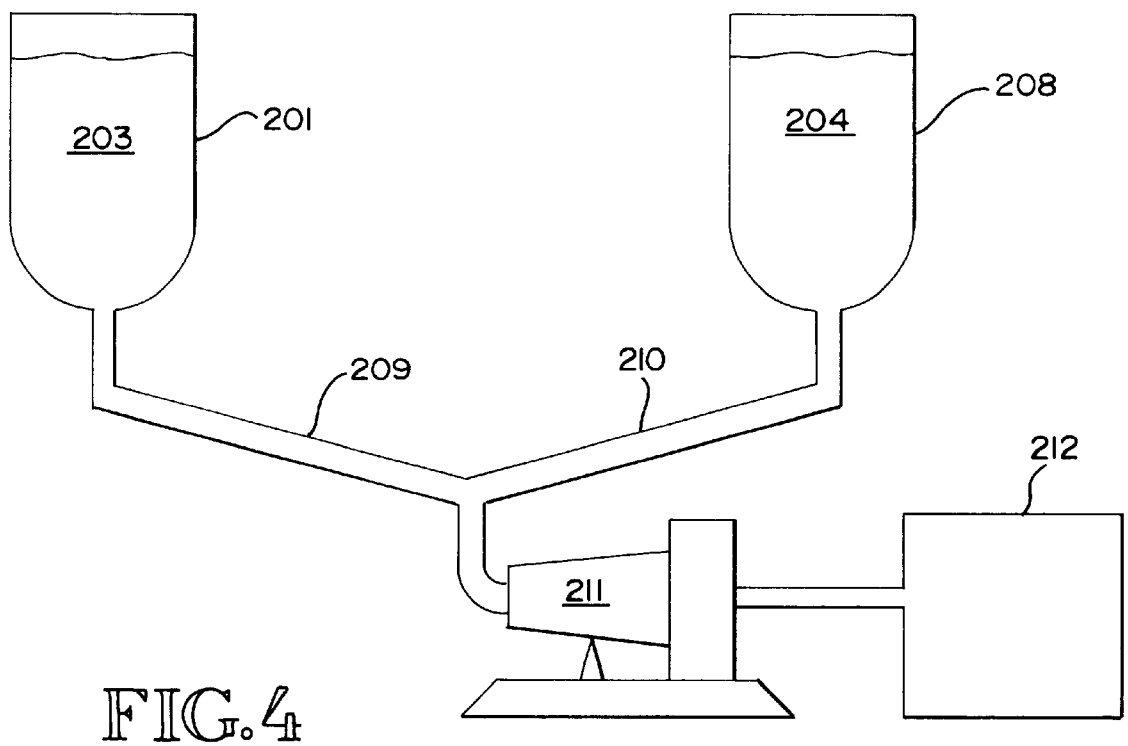
FIG. 4 is a schematic view of a preferred process for making an SEBS modified asphalt emulsion according to the invention.

In the case of emulsified asphalts, SEBS-modified base asphalts are prepared in the manner described and thereafter combined with water slurries to form emulsions by means of already well-understood processes. Such a process is illustrated in FIG. 4. SEBS-modified asphalt 203, prepared by any of the aforedescribed processes, is transferred from tank 201 to mixer or colloid mill 211 by means of feed 209, while water slurry 204 is transferred to the mixer or mill from tank 208 via feed 210. Modified asphalt 203 and slurry 204 are fed to mill 211, emulsified, and passed to storage tank 212. Preferably, the asphalt-slurry blend is mll led at between approximately 150 and approximately 200° F. at approximately 3600 RPM, resulting in a smooth emulsion of micron-sized asphalt particles suspended in the slurry. While high-speed, high-shear blenders of the type described above for mixing powdered or pelletized SEBS with asphalt are preferred for use in the emulsifying process, it will be apparent to those familiar with the art that a wide variety of mixing times, speeds, and conditions will serve, as is already well known. Preferred emulsions according to this aspect of the invention comprise water slurry in proportions of approximately 40% to approximately 60% by weight of the emulsion after the slurry is added. Preferred water slurries for use with this aspect of the invention comprise 85% or more water, 2–8% bentonite clay, and relatively smaller amounts of additives to encourage thickening or gelling of the emulsion, and to act as biocides. However, any slurry of the type commonly used to make emulsified asphalts will serve; the selection or identification of an appropriate slurry for use with the invention will not trouble one of ordinary skill in the art of making asphalt emulsions. Modified asphalt stocks for use in making such emulsions preferably comprise between approximately 5% and approximately 7% by weight SEBS rubber before the addition of water slurry or other additives.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

INDUSTRIAL APPLICABILITY

The invention has applicability to the roofing, paving, sealing, and waterproofing fields, particularly in the asphalt industry. The invention provides greatly improved, durable, and flexible asphalts having superior resistance to degradation due to exposure to ultraviolet rays, ozone, and fatigue due to thermal expansions and contractions.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. An asphalt-copolymer mixture useful in roofing, sealing, paving waterproofing membranes and related applications, said mixture formed by mixing asphalt with a plasticized styrene ethylene-butylene-styrene (SEBS) compound and with mineral spirits such that an asphaltic mixture comprising at least 1% by weight of SEBS copolymer results.

2. The mixture of claim 1, wherein the mineral sprints comprise approximately 30% to approximately 50% by weight of the mixture after the mineral sprints are added.

3. The mixture of claim 1, wherein the mixture further comprises fillers for adapting the mixture for use as a plastic, a coating or an adhesive.

4. The mixture of claim 1, wherein the mixture exclusive of the mineral spirits comprises approximately 4% to approximately 6% by weight styrene-ethylene-butylene-styrene rubber.

5. An asphalt-copolymer mixture useful in roofing, sealing, paving, waterproofing membranes and related applications, said mixture formed by mixing asphalt with a plasticized styrene-ethylene-butylene-styrene (SEBS) compound and blending the resultant mixture with a water slurry to form an emulsion.

6. The mixture of claim 5, wherein the water slurry comprises approximately 40% to approximately 60% by weight of the emulsion after the slurry is added.

7. The mixture of claim 5, wherein the mixture exclusive of the water slurry comprises approximately 5% to approximately 7% by weight styrene-ethylene-butylene-styrene rubber.

8. An asphalt-copolymer mixture useful in roofing, sealing, paving, waterproofing membranes and related applications, said mixture formed by mixing asphalt with a plasticized styrene-ethylene-butylene-styrene compound such that an asphaltic mixture comprising at least 1% by weight of styrene-ethylene-butylene-styrene copolymer results, said mixture further comprising a water slurry, the mixture being blended to form an emulsion.

9. The mixture of claim 8, wherein the water slurry comprises approximately 40% to approximately 60% by weight of the emulsion after the slurry is added.

10. The mixture of claim 8, wherein the mixture exclusive of the water slurry comprises approximately 5% to approximately 7% by weight SEBS rubber.

* * * * *

UNITED STATES PATENT AND TRADEMARK OFFICE
CERTIFICATE OF CORRECTION

PATENT NO. : 5,929,144
DATED : July 27, 1999
INVENTOR(S) : John R. Fields

It is certified that error appears in the above-identified patent and that said Letters Patent is hereby corrected as shown below:

Claim 1, should read as follows:

"1. An asphalt-copolymer mixture useful in roofing, sealing, paving, waterproofing membranes and related applications, said mixture formed by mixing asphalt with a plasticized styrene-ethylene-butylene-styrene (SEBS) compound and with mineral spirits such that an asphaltic mixture comprising at least 1% by weight of SEBS copolymer results."

On the title page,

Please add at designation [56] the following References Cited U.S. Patent Documents:

| Patent No. | Date | Inventor | Class |
|---|---|---|---|
| 2,173,638 | 9/1939 | Rozenbroek | 554/78 |
| 2,592,564 | 4/1952 | Hardman | 106/273 |
| 3,004,056 | 10/1961 | Nunn et al. | 558/114 |
| 3,189,628 | 6/1965 | Knight et al. | 530/232 |
| 3,776,985 | 12/1973 | Nehmsmann et al. | 558/114 |
| 4,173,679 | 11/1979 | Kleber et al. | 428/375 |
| 4,273,685 | 6/1981 | Marzocchi et al. | 523/150 |
| 4,368,228 | 1/1983 | Gorgati | 428/110 |
| 4,420,524 | 12/1983 | Gorgati | 428/110 |
| 4,494,992 | 1/1985 | Schreuders et al. | 106/277 |
| 4,709,982 | 12/1987 | Corne et al. | 350/96.23 |
| 4,966,621 | 10/1990 | Heinrich et al. | 71/86 |
| 5,100,715 | 3/1992 | Zimmerman et al. | 428/147 |
| 5,169,690 | 12/1992 | Zimmerman et al. | 427/389.8 |
| 5,195,290 | 3/1993 | Hulett | 52/518 |
| 5,273,683 | 12/1993 | Krivohlavek | 252/351 |
| 5,326,797 | 7/1994 | Zimmerman et al. | 524/59 |
| 5,334,641 | 8/1994 | Rouse | 524/59 |

UNITED STATES PATENT AND TRADEMARK OFFICE
CERTIFICATE OF CORRECTION

PATENT NO. : 5,929,144

DATED : July 27, 1999

INVENTOR(S) : John R. Fields

It is certified that error appears in the above-identified patent and that said Letters Patent is hereby corrected as shown below:

Continuation of adding References Cited U.S. Patent Documents:

| | | | |
|---|---|---|---|
| 5,362,316 | 11/1994 | Paradise | 106/278 |
| 5,397,818 | 3/1995 | Flanigan | 524/68 |
| 5,436,285 | 7/1995 | Causyn et al. | 524/68 |
| 5,474,838 | 12/1995 | Callaway et al. | 428/102 |
| 5,525,653 | 6/1996 | Rouse | 524/71 |
| 5,548,027 | 8/1996 | Heucher et al. | 525/179 |
| 5,674,313 | 10/1997 | Aoyama et al. | 106/2 |
| 5,437,923 | 8/1995 | Kalkanoglu | 428/291 |
| 5,019,610 | 5/1991 | Sitz et al. | 524/61 |
| 4,923,712 | 5/1990 | Gladfelter et al. | 427/140 |
| 4,609,697 | 9/1986 | Albers | 524/68 |

Column 3, line 65, delete "maling" and insert therefor --making--.

Signed and Sealed this

Eighteenth Day of January, 2000

Attest:

Q. TODD DICKINSON

*Attesting Officer*  *Commissioner of Patents and Trademarks*